United States Patent

Bawden et al.

[15] 3,653,114
[45] Apr. 4, 1972

[54] HOSE COUPLING REMOVER

[72] Inventors: Orval C. Bawden; Frank A. Dimick, both of Orem, Utah

[73] Assignee: United States Steel Corporation

[22] Filed: Dec. 4, 1969

[21] Appl. No.: 882,250

[52] U.S. Cl. ................................. 29/237, 29/259, 29/263
[51] Int. Cl. ........................................................ B23p 19/00
[58] Field of Search .............. 269/55, 56; 29/237, 234, 239, 29/259, 263, 235, 282, 280, 255

[56] References Cited

UNITED STATES PATENTS

| | | | |
|---|---|---|---|
| 2,253,411 | 8/1941 | Thompson | 29/259 X |
| 1,094,978 | 4/1914 | Church | 29/237 |
| 3,217,395 | 11/1965 | McBroom et al. | 29/234 X |

*Primary Examiner*—Andrew R. Juhasz
*Assistant Examiner*—Leon Gilden
*Attorney*—Donald S. Ferits

[57] ABSTRACT

Apparatus for extracting a hose coupling from a hose, said coupling having a shank inserted in said hose and a coupling member extending axially outwardly from the end of said hose, said apparatus comprising a frame, means mounted on said frame for gripping said coupling member, a stationary support in said frame having an opening therein in which said coupling is inserted to a position with the end of said hose abutting against the surface of said support about said opening and means for actuating said gripping means to pull said coupling member away from said support to remove said shank from said hose.

4 Claims, 7 Drawing Figures

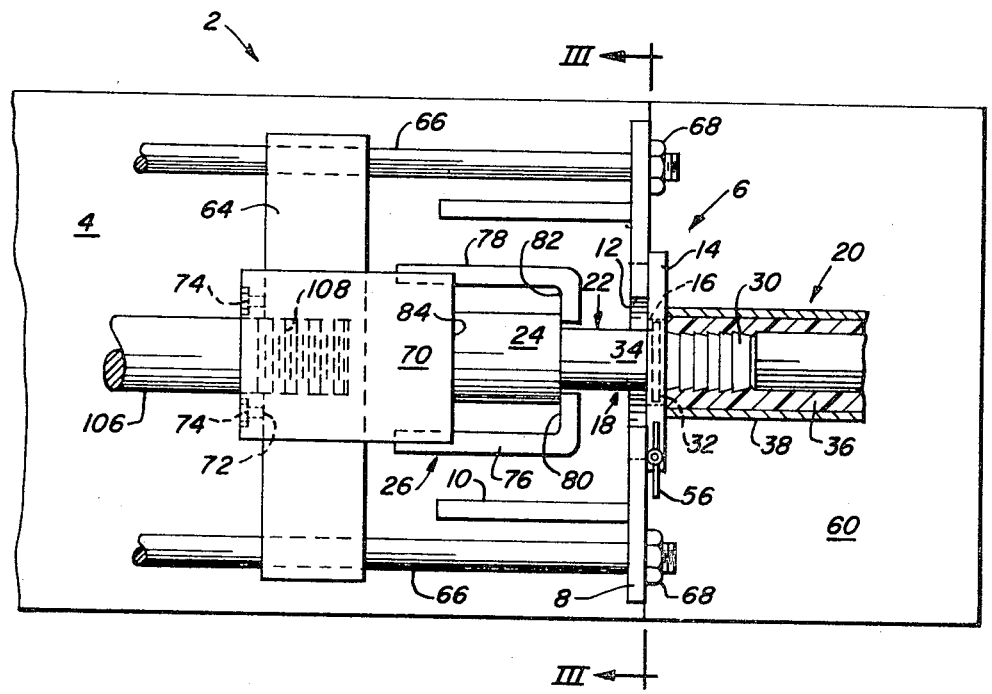

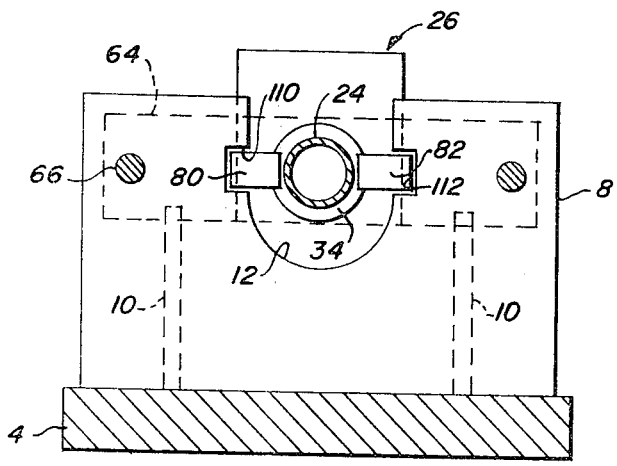
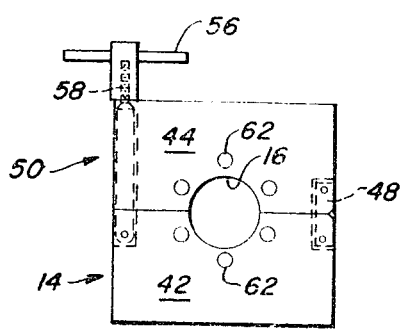
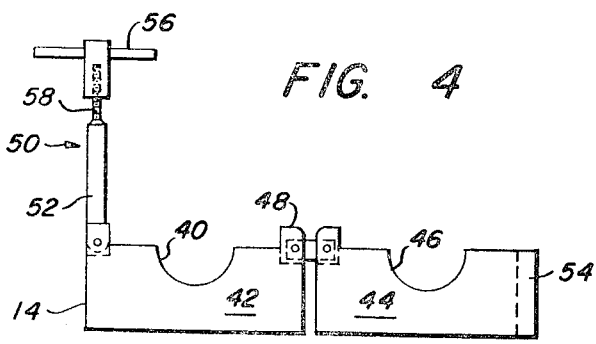
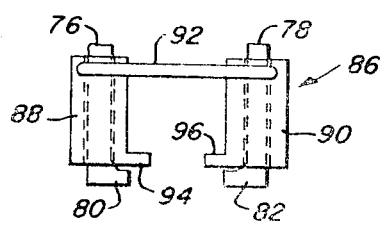
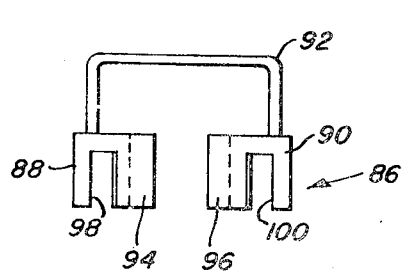

HOSE COUPLING REMOVER

This invention relates to apparatus for extracting or removing a hose coupling from a hose, more particularly, an armor-clad, rubber hose.

For elevated temperature service, for example, on industrial furnaces, water or other coolants are often conducted to a cooling section by one or more hoses. A standard hose coupling may be used made up of interconnected male and female portions. The male portion is often mounted on the furnace. The female portion has a shank inserted in the hose and a coupling member extending axially outwardly from the end of the hose to receive and to hold the male portion. The hose used is often an armored rubber hose. When the hose is worn and must be discarded, the coupling is removed from the hose for reuse. In this severe service the shank of the back coupling is held very tightly in the hose. It has been removed by cutting the hose behind the shank end with a shck saw and then cutting the remainder of the hose with a hammer and chisel to permit its removal from the shank. This method is time consuming and unsafe.

It is therefore an object of the invention to provide apparatus for extracting the shank of a coupling from a hose that will substantially reduce the time and work required for the job, that will effect the extraction without damage to the coupling and will remove the safety hazard that has been present with the use of prior tools for extracting couplings.

This and other objects will be more apparent from the following description of our invention and the attached drawings in which:

FIG. 1 is a side elevation of apparatus, partly in section, for extracting the female portion of a hose coupling from a hose;

FIG. 2 is a plan view of a portion of the apparatus shown in FIG 1;

FIG. 3 is an end elevation taken on line III—III of FIG. 2;

FIG. 4 is an end elevation of a pair of hinged plates and clamping means therefor for inserting a coupling before withdrawing a shank from a hose;

FIG. 5 is an end elevation showing another embodiment of FIG. 4;

FIG. 6 is an end elevation of an adapter to receive a smaller coupling, and

FIG. 7 is a plan view showing the adapter of FIG. 6 in operating position.

Referring to FIGS. 1–3, apparatus 2 includes a frame 4, which may be a horizontally positioned supporting plate. A stationary support 6 includes a vertical plate 8, mounted on frame 4 intermediate the ends thereof, and reinforced by spaced, gusset plates 10. Plate 8 has an opening 12 therein extending downwardly from the top thereof and resembling a semiellipse. Support 6 preferably includes said vertical back-up plate 8 and a second or retaining plate 14, abutting plate 8 and having an opening 16 therein. Preferably, openings 12 and 16 have a common axis. Support 6 receives a coupling 18 and a portion of a hose 20 for extraction of the coupling from the hose. Coupling 18 has a shank 22 inserted in hose 20 and a coupling member 24 extending axially outwardly from the end of the hose. As shown in FIGS. 1 and 2 the end of hose 20 is mounted to the right of and abuts against the surface of support 6 about the opening. Coupling member 24 is mounted to the left of support 6 in a gripping member 26, the latter being attached to a pulling means 28 for moving the gripping member 26 to pull coupling member 24 away from support 6 to remove shank 22 from hose 20.

All commercially available hose couplings have a shank and a coupling member in the female portion thereof, although there may be variations in individual features thereof, as shown in FIGS. 1 and 2, the shank 22 of coupling 18 has a serrated portion 30 which is inserted in the end of hose 20 until a flange 32 thereon abuts against the hose end. A smooth flank portion 34 is joined to coupling member 24. Hose 20 is here shown as comprising a rubber core 36 surrounded by an armor layer 38. Industrial hoses may have additional layers therein, for example, layers of cloth and/or wire.

As shown in FIGS. 1, 2 and 4 the second or retaining plate 14 preferably comprises a pair of lower and upper hinged plates, wherein a hose is inserted in the semi-circular opening 40 in lower plate 42. Upper plate 44 having a semi-circular opening 46 is then rotated about hinge member 48 until the two plates abut. A clamping lug 50 hinged on plate 42 is then rotated into a vertical position where a body portion 52 thereof fits into a slot 54 in plate 44. An internally threaded handle 56 is then turned clockwise on a mating threaded portion 58 of body 52 to clamp plates 42 and 44 together to define the circular opening 16. Opening 16 preferably has sufficient clearance to receive the flange 32, yet to firmly hold the abutting end of hose 20 against the surface about opening 16. Retaining plate 14 is preferably mounted on a plate 60, to properly position the axis of opening 16. Plate 60 is mounted on frame 4 and preferably abuts plate 8.

Another embodiment of retaining plate 14 is shown in FIG. 5. The construction and assembly thereof are the same as shown in FIG. 4, except that a plurality of short pins 62 are spaced around opening 16. This embodiment is used preferably with smaller diameter hoses. When a small hose is inserted inside the pins, the hose is centered to assure firm abuttment thereof against the surface about opening 16.

A crosshead 64 is mounted for linear movement with regard to plate 8 on two, spaced, parallel, slide rods 66, mounted on plate 8 with bolts 68. Gripping member 26 includes a block 70 having a transverse slot 72 extending upwardly from the bottom of the block at one end thereof. Slot 72 serves for mounting block 70 on the crosshead. Spaced set screws 74 can be tightened to hold block 70 in place on the crosshead. A pair of arms 76, 78 are mounted on and extend outwardly from the opposite end of block 70. Arms 76, 78 terminate in respective internal flanges 80, 82. As illustrated in FIGS. 1 and 2, arms 76, 78, the end 84 of block 70 from which said arms extend and internal flanges 80, 82 provide an opening for inserting and gripping a coupling member 24.

FIG. 6 shows an adapter 86 preferably used for gripping smaller couplings. Adapter 86 includes spaced blocks 88, 90 and a handle 92 welded thereto to hold the blocks in proper spaced-apart relationship. Each block 88, 90 terminates at one end thereof in a respective internal flange 94, 96. Upwardly extending slots 98, 100 from the bottoms of the respective blocks are adapted for mounting blocks 88, 90 respectively on arms 76, 78 as shown in FIG. 7. Blocks 88, 90 and their respective internal flanges 94, 96 provide an opening for inserting and gripping a smaller coupling member than coupling member 24.

Pulling means 28 for moving gripping means 26 to pull coupling member 24 away from support 6 to remove shank 22 from hose 20, includes a conventional, reciprocable cylinder 102 mounted on frame 4, one pipe 104 for actuating fluid being shown. Cylinder piston rod 106 connects the cylinder and crosshead 64. As shown in FIGS. 1 and 2, threaded portions 108 on the rod and crosshead may be connected together in the usual manner. It is preferred that the pulling means 28, gripping means 26, support 6, coupling 18 and hose 20 have substantially a common axis.

In operation, cylinder 102 is actuated to move gripping member 26 to the right as shown in FIGS. 1 and 2. When coupling 18 has a smooth flank portion 34 that is much shorter than shown in FIGS. 1 and 2, gripping member 26 is advanced to the right until arms 76, 78 thereof pass through notches 110, 112 in opening 12 in plate 8 as shown in FIG. 3. To extract a coupling 18 from a hose 20 the combination is dropped into the apparatus so that the coupling member 24 is then received in the opening in gripping member 26 provided by the end 84 of block 70, arms 76, 78 and internal flanges 80, 82 thereof. Flange 32 on shank 22 of coupling 18 is then placed in opening 40 in the lower half 42 of a hinged retaining plate as shown in FIGS. 4 and 5. The end of hose 20 is placed firmly against that portion of plate 42 surrounding opening 40 and is also placed firmly down on pins 62, when said pins are used. Plate 44 is rotated into place to abut plate 42, clamping lug 50 is rotated into place in slot 54 of plate 44 and handle 56 is properly rotated to hold together the halves of retaining plate 14. Cylinder 102 is now actuated to move gripping member 26 to the left as shown in FIGS. 1 and 2 until retaining plate 14 abuts supporting plate 8. Continued actuation of cylinder 102 will continue to pull gripping member 26 to the left, with consequent removal of serrated shank portion 30 of coupling 18 from hose 20. The extracted coupling 18 and hose 20 may be separately removed from apparatus 2 and the parts thereof arranged as described hereinabove to extract another coupling from a section of hose.

It can therefore be seen that the apparatus 2 is a much safer tool for removing couplings from hoses than the tools that have been used in the past. The couplings are extracted without damage thereto. Also, the total time required to set up the apparatus to extract couplings is usually no more than some minutes, while prior methods and tools have often required hours of hard work to do the same job.

While a number of embodiments of our invention have been shown and described herein, other adaptations and modifications will be apparent within the scope of the following claims.

We claim:

1. Apparatus for extracting a hose coupling from a hose, said coupling having a shank inserted in said hose and a coupling member extended axially outwardly from the end of said hose, said apparatus comprising;
   a frame:
   means mounted on said frame for gripping said coupling member;
   a stationary support on said frame having an opening therein in which said coupling is inserted to a position with the end of said hose abutting against the surface of said support about said opening;
   said stationary support including a vertical plate mounted transversely on said frame intermediate the ends thereof and having an opening therein in which said coupling is inserted;
   means for actuating said gripping means to pull said coupling member away from said support to remove said shank from said hose;
   said gripping means including:
   a crosshead mounted for linear movement with regard to said plate;
   a block mounted on said crosshead; and
   a pair of arms extending outwardly from said block for gripping engagement with said coupling member.

2. Apparatus of claim 1 wherein the extremities of said pair of outwardly extending arms terminate in internal flanges and an opening provided by said block and pair of arms for inserting said coupling member.

3. Apparatus of claim 2 including:
   a pair of spaced blocks, means for holding said blocks in spaced-apart position, an extremity of each of said blocks terminating in an internal flange, said blocks having slots therein to insert said blocks upon said pair of arms and an opening provided by said pair of spaced blocks and internal flanges for inserting and gripping a coupling member.

4. Apparatus of claim 1 wherein the means for actuating said gripping means includes a reciprocable cylinder mounted on said frame and a rod connecting said cylinder and said crosshead.

* * * * *